United States Patent
Xie et al.

(10) Patent No.: US 10,796,670 B1
(45) Date of Patent: Oct. 6, 2020

(54) METHOD AND DEVICE FOR REDUCING BANDWIDTH CONSUMPTION, DISPLAY CONTROLLER, AND STORAGE MEDIUM

(71) Applicant: Sanechips Technology Co., Ltd., Shenzhen, Guangdong (CN)

(72) Inventors: Minhua Xie, Shenzhen (CN); Huabo Guan, Shenzhen (CN); Wanyong Ai, Shenzhen (CN); Zhonglin Li, Shenzhen (CN)

(73) Assignee: SANECHIPS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/491,579

(22) PCT Filed: Jul. 25, 2017

(86) PCT No.: PCT/CN2017/094270
§ 371 (c)(1),
(2) Date: Sep. 6, 2019

(87) PCT Pub. No.: WO2018/166132
PCT Pub. Date: Sep. 20, 2018

(30) Foreign Application Priority Data

Mar. 14, 2017 (CN) .......................... 2017 1 0148694

(51) Int. Cl.
*G09G 5/39* (2006.01)
*G09G 5/36* (2006.01)
(Continued)

(52) U.S. Cl.
CPC ............ *G09G 5/397* (2013.01); *G09G 5/363* (2013.01); *G09G 2310/04* (2013.01);
(Continued)

(58) Field of Classification Search
CPC combination set(s) only.
See application file for complete search history.

(56) References Cited

U.S. PATENT DOCUMENTS

2016/0021384 A1* 1/2016 Croxford ............... H04N 19/14
375/240.12
2016/0124697 A1* 5/2016 Sun ........................... G06F 3/14
345/545

FOREIGN PATENT DOCUMENTS

CN 101489052 A 7/2009
CN 102103463 A 6/2011
(Continued)

OTHER PUBLICATIONS

Office Action dated Oct. 23, 2019 for Chinese Patent Application No. 201710148694.7 and English Translation.

*Primary Examiner* — Wesner Sajous
(74) *Attorney, Agent, or Firm* — Cantor Colburn LLP

(57) ABSTRACT

Embodiments of the present disclosure disclose a method and device for reducing bandwidth consumption of a display controller. The method includes: whether image data of a current User Interface (UI) frame to be displayed is the same as image data of a previous UI frame is judged; when the image data of the current UI frame to be displayed is the same as the image data of the previous UI frame, image data in a nontransparent region except a transparent region of the previous UI frame is read; and when the image data of the current UI frame to be displayed is different from the image data of the previous UI frame, a transparent region of the current UI frame to be displayed is determined according to a preset strategy. Embodiments of the present disclosure further disclose a display controller and a computer storage medium.

18 Claims, 6 Drawing Sheets

(51) Int. Cl.
*H04N 19/17* (2014.01)
*G09G 5/397* (2006.01)

(52) U.S. Cl.
CPC ..... *G09G 2340/10* (2013.01); *G09G 2350/00* (2013.01); *G09G 2360/18* (2013.01)

(56) References Cited

FOREIGN PATENT DOCUMENTS

| | | | |
|---|---|---|---|
| CN | 102724582 | A | 10/2012 |
| CN | 104267801 | A | 1/2015 |
| CN | 106127721 | A | 11/2016 |
| WO | 2013015309 | A1 | 1/2013 |

\* cited by examiner

METHOD AND DEVICE FOR REDUCING BANDWIDTH CONSUMPTION, DISPLAY CONTROLLER, AND STORAGE MEDIUM

The present application is filed based upon and claims priority to Chinese Patent Application No. 201710148694.7, filed on Mar. 14, 2017, the entire contents of which are incorporated herein by reference.

TECHNICAL FIELD

The present disclosure relates to the field of media playing, and particularly to a method and device for reducing bandwidth consumption of a display controller, a display controller and a computer storage medium.

BACKGROUND

At present, a video resolution supported by a set-top box, for example, a smart Android set-top box, has increased to 4K, namely a physical resolution of 3,840×2,160, and a frame frequency has increased to 60 Frame Per Second (FPS). However, the relatively high video resolution and frame frequency highlight a problem that Double Data Rate Synchronous Dynamic Random Access Memory (DDR SDRAM) and bus bandwidth consumed are extremely high when a video is playing. Therefore, how to alleviate high bandwidth consumption caused by the high frame frequency and the high resolution is one of problems urgent to be solved in an existing art.

SUMMARY

Embodiments of the present disclosure are expected to provide a method and device for reducing bandwidth consumption of a display controller, a display controller and a computer storage medium, to be capable of solving the problem of high bandwidth consumption in display.

The technical solutions of the present disclosure are implemented as follows.

According to a first aspect, an embodiment of the present disclosure provides a method for reducing bandwidth consumption of a display controller. The method includes: whether image data of a current User Interface (UI) frame to be displayed is the same as image data of a previous UI frame is judged; when the image data of the current UI frame to be displayed is the same as the image data of the previous UI frame, image data in a nontransparent region except a transparent region of the previous UI frame is read; and when the image data of the current UI frame to be displayed is different from the image data of the previous UI frame, a transparent region of the current UI frame to be displayed is determined according to a preset strategy.

According to a second aspect, an embodiment of the present disclosure provides a device for reducing bandwidth consumption of a display controller, which includes a judgment module, a data reading module and a transparent region determination module.

The judgment module is configured to judge whether image data of a current User Interface (UI) frame to be displayed is the same as image data of a previous UI frame.

The data reading module is configured to read image data in a nontransparent region except a transparent region of the previous UI frame.

The transparent region determination module is configured to determine a transparent region of the current UI frame to be displayed according to a preset strategy.

According to a third aspect, an embodiment of the present disclosure provides a method for reducing bandwidth consumption of a display controller applied to the display controller. The method includes: if image data of a User Interface (UI) is updated in an nth screen refresh cycle, image data of a whole frame of a buffered UI frame is read from a UI buffer region; a transparent region of the read UI frame is determined according to a preset strategy; and if no image data of the UI is updated in an (n+1)th screen refresh cycle, image data of a nontransparent region is read from the UI buffer region according to a determination result, wherein n is 0 or a positive integer.

According to a fourth aspect, an embodiment of the present disclosure provides a display controller, which includes a memory and a processor.

The memory is configured to store information.

The processor is configured to be connected with the memory and configured to execute computer-executable codes stored in the memory to be enabled to implement the method for reducing the bandwidth consumption of the display controller provided in the abovementioned one or more technical solutions.

According to a fifth aspect, an embodiment of the present disclosure provides a computer storage medium on which computer-executable instructions are stored, and the computer-executable instructions are used for the method for reducing the bandwidth consumption of the display controller provided in the abovementioned one or more technical solutions.

The embodiments of the present disclosure provide the method and device for reducing the bandwidth consumption of the display controller, the display controller and the computer storage medium. According to the method, whether the image data of the current UI frame to be displayed is the same as the image data of the previous UI frame is judged, and when the image data of the current UI frame to be displayed is the same as the image data of the previous UI frame, only image data in the nontransparent region except the transparent region of the previous UI frame is read, that is, the image data in the transparent region of the previous UI frame is not read, so that a data volume read from the UI buffer region by the display controller through a bus is reduced, and the bandwidth consumption of the display controller is greatly reduced.

DETAILED DESCRIPTION

The technical solutions in the embodiments of the present disclosure will be described clearly and completely below in combination with the drawings in the embodiments of the present disclosure. It should be understood that alternative embodiments described below are adopted only to describe and explain the present disclosure and not intended to limit the present disclosure.

Figure 1:
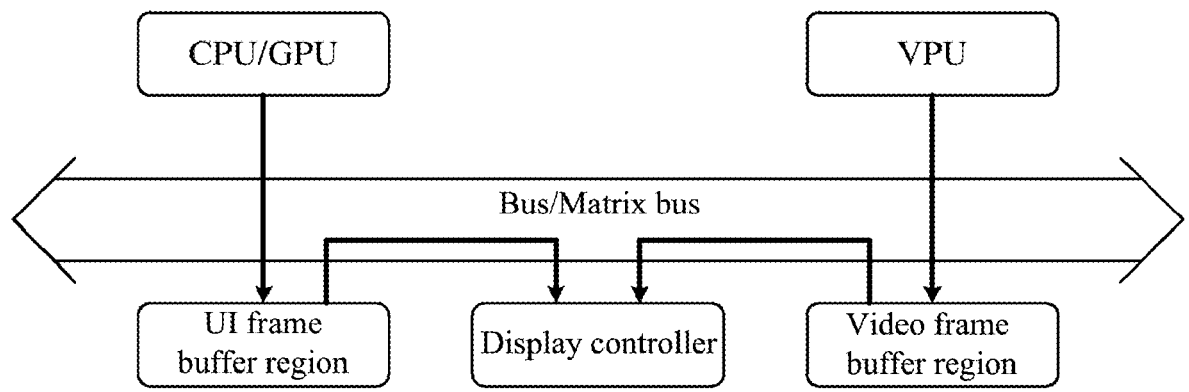
FIG. 1 is a schematic diagram of a general display principle of a display apparatus according to an embodiment of the present disclosure.

It is found by researches that a main application scenario of a smart set-top box is media playing, particularly full-screen playing. A User Interface (UI) is required to be used only for caption display and human-computer interaction. During media playing and playing interaction, all or most of the UI is transparent. When an Application (App) (for example, an Android application) interacts with a user, there are contents on the UI. That is, the contents of the UI in a DDR SDRAM change dynamically. A display controller reads image data to be displayed row by row from the DDR SDRAM at a unified frame frequency of 60 frame per second through an internal bus of a chip, performs processing such as layer blending, and then sends to a High Definition Multimedia Interface (HDMI) or a Composite Video Broadcast Signal (CVBS) interface for displaying. As shown in FIG. 1, the FIG. 1 illustrates a general display principle for a display apparatus. From FIG. 1, it can be seen that a display controller reads image data of a corresponding UI frame to be displayed and video frame to be played from a UI frame buffer region and a video frame buffer region in a DDR SDRAM according to a certain screen refresh rate through an internal bus of a chip (for example, a Bus/Matrix bus) respectively, performs processing such as layer blending, and then sends to an HDMI or a CBVS interface for displaying. Herein, a Central Processing Unit (CPU) and a Graphics Processing Unit (GPU) are configured to dynamically generate UI frame buffer region data, and the CPU is further configured to control updating of a configuration parameter of the display controller; and a Video Processing Unit (VPU) is configured to periodically generate video frame buffer region data. Here, assumed a resolution of 1,080 is adopted by a UI, namely a physical resolution of the UI is 1,920×1,080, a bandwidth consumed by UI display of the display controller is: (1,920×1,080×32Bits/Pixel)×60FPS=3,840 Mbps.

However, during video playing, a bus bandwidth is always quite intense and a UI frame is a fully transparent frame most of the time. Since the DDR SDRAM is kept in an on state, UI display may still consume the bandwidth calculated above.

In view of this, an embodiment of the present disclosure provides a method for reducing bandwidth consumption of a display controller. From the figure, it can be seen that the method may include: in a screen refresh cycle, if it is found that image data of a UI does not change, only data in a non-transparent region of a UI frame is read from a UI buffer region in the corresponding cycle according to a transparent region and/or nontransparent region determined previously, so that reading of useless data in the transparent region is reduced, a data transmission volume of a bus is reduced, and an occupied bandwidth and occupied reading resources are reduced. The solution will be described below in combination with specific embodiments and the drawings in detail.

Embodiment One

Figure 2:
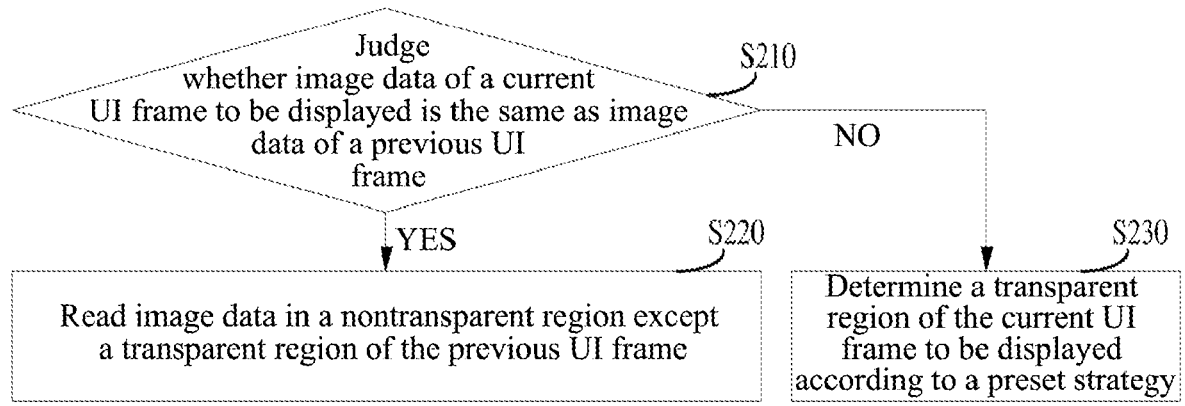
FIG. 2 is a schematic diagram of a method for reducing bandwidth consumption of a display controller according to an embodiment of the present disclosure.

As shown in FIG. 2, a method for reducing bandwidth consumption of a display controller according to an embodiment of the present disclosure is illustrated. From the figure, it can be seen that the method may include the following acts S210-S230.

In S210, whether image data of a current UI frame to be displayed is the same as image data of a previous UI frame is judged; if yes, S220 is executed; otherwise S230 is executed.

In S220, image data in a nontransparent region except a transparent region of the previous UI frame is read.

In S230, a transparent region of the current UI frame to be displayed is determined according to a preset strategy.

Under a normal condition, image data of a UI frame to be displayed is stored in a UI frame buffer region in a DDR SDRAM, and updating of the image data of the UI frame to be displayed in the UI frame buffer region is controlled by a CPU/GPU. The display controller may access (namely, read) the image data of the UI frame to be displayed in the UI frame buffer region through a bus.

It also needs to be noted here that the "previous UI frame" and "current UI frame to be displayed" described in FIG. 2 are only a relative expression. For example, the "previous UI frame" is denoted as an ith frame, the "current UI frame to be displayed" is denoted as an (i+1)th frame. After completing reading and displaying of the image data of the ith frame, the display controller reads and displays the data of the (i+1)th frame. In such case, the ith frame is called the "previous UI frame" relative to the (i+1)th frame, and the (i+1)th frame to be displayed is called as the "current UI frame to be displayed". Such a naming approach is only for convenient for description of the implementation solution.

Exemplarily, the act in S230 that the transparent region of the current UI frame to be displayed is determined according to the preset strategy includes the following S2301 and S2302.

In S2301, the image data of the current UI frame to be displayed is read according to a preset data reading rule.

In S2302, the currently read image data of the UI frame to be displayed is detected according to a preset detection rule, and the transparent region of the current UI frame to be displayed is determined.

Specifically, the act in S2301 that the image data of the current UI frame to be displayed is read according to the preset data reading rule may include: the image data of the current UI frame to be displayed is read by row according to a preset row reading sequence; or the image data of the current UI frame to be displayed is read by preset rectangular region according to a preset rectangle reading sequence.

Figure 3:
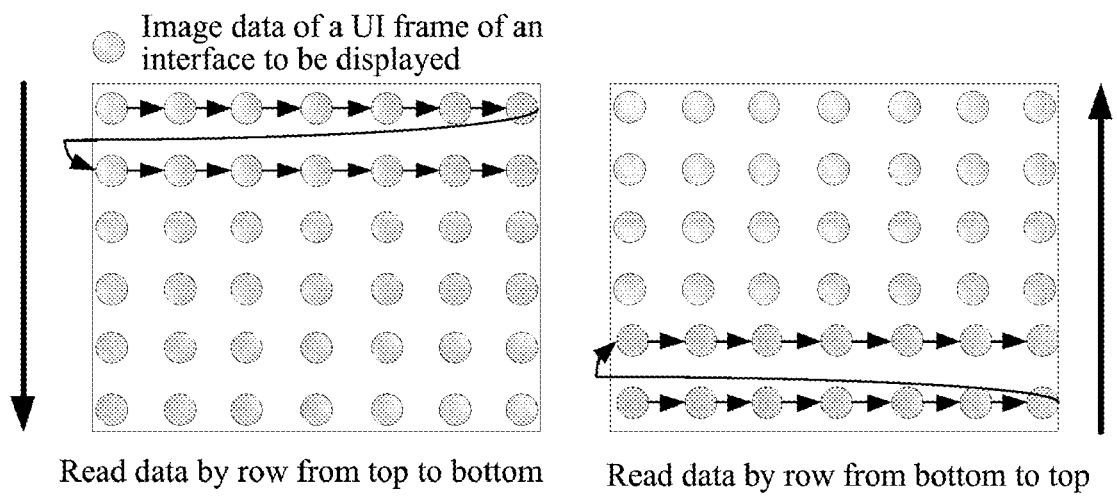
FIG. 3 is a schematic diagram of a data reading method according to an embodiment of the present disclosure.
Figure 4:
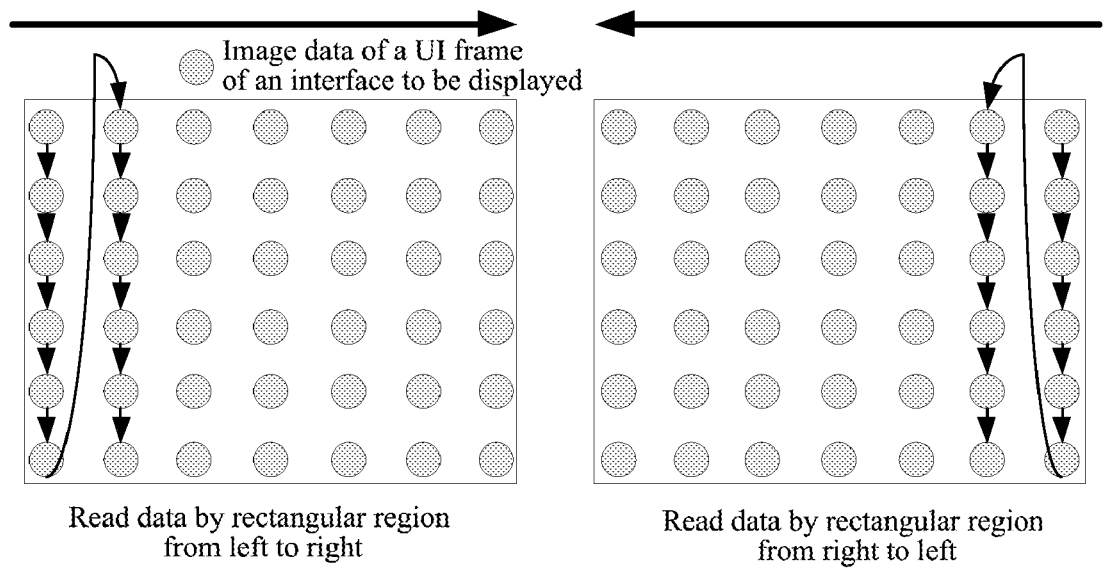
FIG. 4 is a schematic diagram of another data reading method according to an embodiment of the present disclosure.

It needs to be noted here that, besides the abovementioned two data reading modes, the display controller may further read the data of the UI frame in the UI frame buffer region by block. There are no limits made to the specific data reading mode for reading herein. For the data reading sequence, as shown in FIG. 3, the display controller may read the image data of the current UI frame to be displayed according to the preset row reading sequence (for example, from top to bottom, or from bottom to top). Similarly, as shown in FIG. 4, the display controller may also read the image data of the current UI frame to be displayed according to the preset rectangle reading sequence (for example, from left to right, or from right to left). Here, there are also no specific limits to the reading sequence for the image data.

Correspondingly, when the image data of the current UI frame to be displayed is read by row according to the preset row reading sequence, the act in S2302 that the currently read image data of the UI frame to be displayed is detected according to the preset detection rule and the transparent region of the current UI frame to be displayed is determined may specifically include: transparency of the currently read image data of the UI frame to be displayed is detected by row, and a transparent row region of the current UI frame to be displayed is determined, wherein the transparent row region refers to a region where the transparency of the image data in a whole row in the current UI frame to be displayed is 0.

It needs to be noted here that, under a normal condition, a display interface such as an HDMI reads the image data of the UI frame to be displayed by row. Therefore, during a practical application, an approach of detecting the transparent region by row is relatively easy to implement.

In addition, when the image data of the current UI frame to be displayed is read by preset rectangular region according to the preset rectangle reading sequence, the act in S2302 that the currently read image data of the UI frame to be displayed is detected according to the preset detection rule and the transparent region of the current UI frame to be displayed is determined includes: transparency of the currently read image data of the UI frame to be displayed is detected by preset rectangular region, and a transparent rectangular region of the current UI frame to be displayed is determined, wherein the transparent rectangular region refers to a region where the transparency of the image data in a whole rectangular region in the current UI frame to be displayed is 0.

Figure 5:
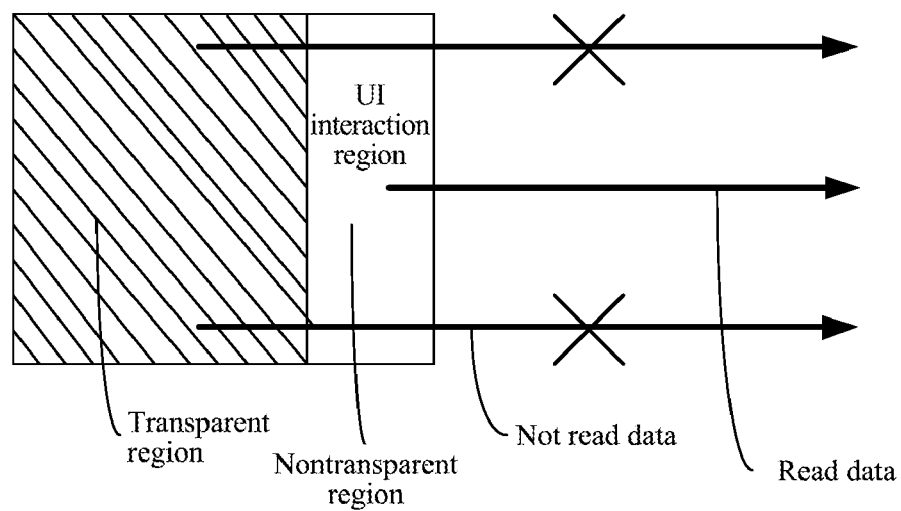
FIG. 5 is a schematic diagram of interface display of a UI frame according to an embodiment of the present disclosure.

It needs to be noted here that, when a UI interaction region is a vertical stripe shape, as shown in FIG. 5, if transparent region detection is still performed on the UI interaction region by row, no valid transparent region will be found. However, if transparent region detection is performed by preset rectangular region, it may be detected that a left half of the UI frame shown in FIG. 5 is a transparent region, i.e., a shadow region shown in FIG. 5, and a right region where the UI interaction region is located is a nontransparent region.

It needs also to be noted that, for convenient to rapidly recognize the transparent region of the previous UI frame at starting of the previous UI frame, each transparent row region or transparent rectangular region may be tagged at the same time of determining the transparent row region or the transparent rectangular region. Thus, at starting of the current UI frame, the display controller may determine whether to read the image data in each corresponding row or each rectangular region according to a tag value of the row or the rectangular region.

In a practical application, for example, the transparent row region or the transparent rectangular region is tagged with "1", and a nontransparent row region or a nontransparent rectangular region is tagged with "0". It can be understood that the nontransparent row region or the nontransparent rectangular row refers to a region where the transparency of at least one piece of image data in the image data of the whole row or the image data of the whole rectangular region is not 0. Therefore, when reading the image data of the UI frame to be displayed, once the display controller detects that the transparency of any piece of image data in a certain row region or a certain rectangular region is not 0, the display controller tags the region as a nontransparent row region or a nontransparent rectangular region. In addition, only the transparent region is tagged, or only the nontransparent region is tagged. For example, when reading the image data of the current UI frame to be displayed, if the display controller detects that the transparency of all the image data in a certain row region or a certain rectangular region is 0, the display controller tags the region as a transparent row region or a transparent rectangular region, and an untagged region in the current UI frame to be displayed is a nontransparent region. Similarly, when reading the image data of the current UI frame to be displayed, if the display controller detects that the transparency of any piece of image data in a certain row region or a certain rectangular region is not 0, the display controller tags the region as a nontransparent row region or a nontransparent rectangular region, and an untagged region in the current UI frame to be displayed is a transparent region. Here, some transparent region tagging approaches are provided only. There are no limits made to the specific tagging approach to be adopted.

In addition, in the practical application, after the CPU/GPU updates the image data of the UI frame to be displayed in the UI frame buffer region, or, after the CPU is turned off or the CPU is turned on or a configuration parameter of the display controller is updated, the display controller clears tags of the transparent row region (and/or nontransparent row region) or transparent rectangular region (and/or nontransparent rectangular region) of the previous frame and redetermines the transparent row region or transparent rectangular region of the UI frame to be displayed. Here, the configuration parameter of the display controller mainly includes an address of a currently displayed frame and an address of a frame to be displayed.

The embodiment of the present disclosure provides the method for reducing the bandwidth consumption of the display controller. According to the method, when the image data of the current UI frame to be displayed is the same as the image data of the previous UI frame, only the image data in the nontransparent region except the transparent region of the previous UI frame is read, so that the bandwidth consumption of the display controller is greatly reduced.

Embodiment Two

Figure 6:
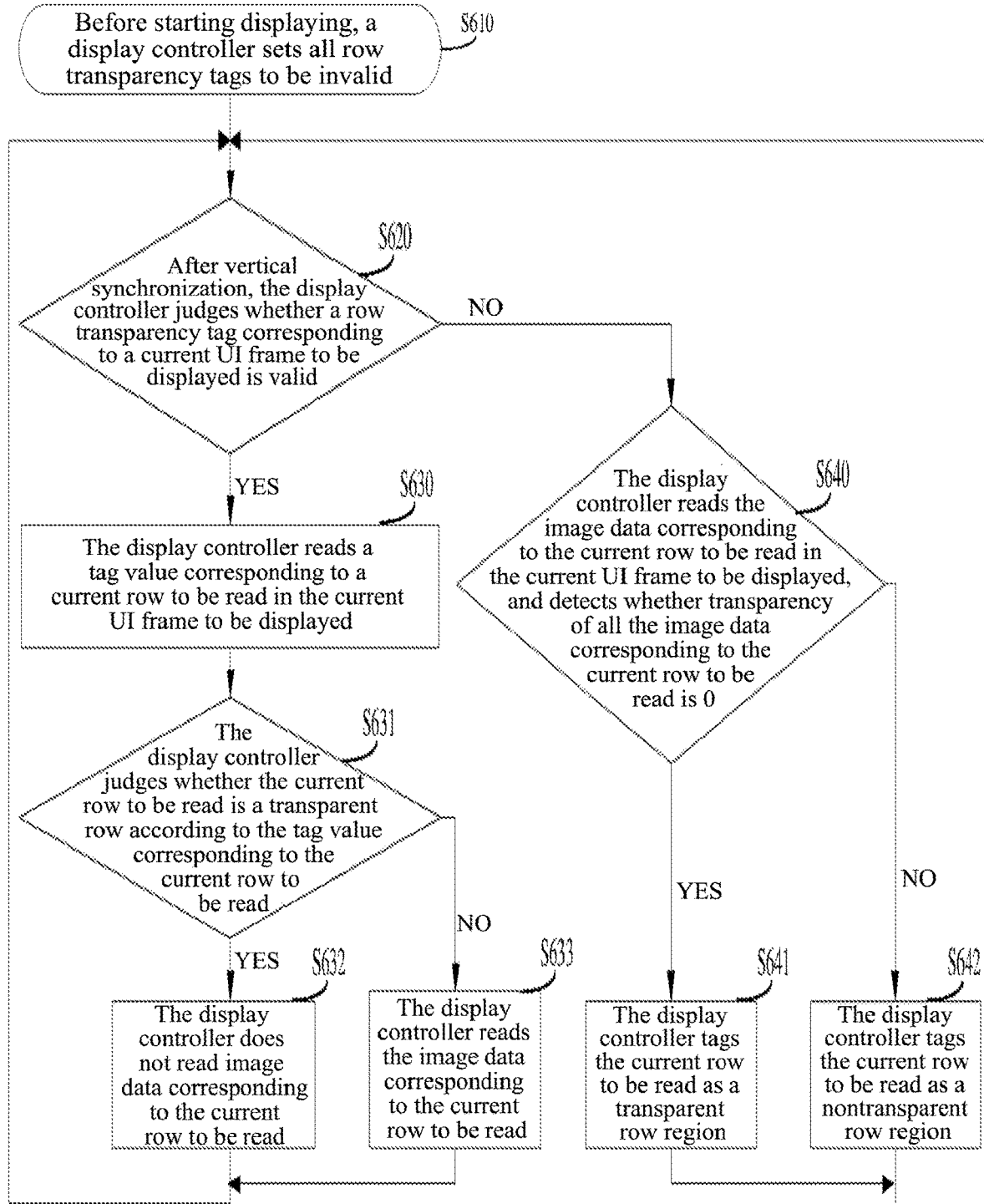
FIG. 6 is a schematic diagram of an alternative implementation process for reducing bandwidth consumption of a display controller according to an embodiment of the present disclosure.

For conveniently understanding the abovementioned technical solution, as shown in FIG. 6, taking reading of image data of a current UI frame to be displayed according to a preset row sequence as an example, the FIG. 6 illustrates an alternative implementation process of reducing bandwidth consumption of a display controller according to an embodiment of the present disclosure. From the figure, it can be seen that the process may include the following implementation acts S610-S642.

In S610, before starting displaying, a display controller sets all row transparency tags to be invalid.

It needs to be noted here that, when a CPU/GPU updates a UI frame to be displayed in a UI frame buffer region and notifies the display controller to switch to use the updated UI frame to be displayed, the display controller is also required to set all the row transparency tags to be invalid. Or, after the CPU is turned off or the CPU is turned on or a configuration parameter of the display controller is updated, the display controller is required to set all the row transparency tags to be invalid.

In S620, after Vertical Synchronization (VSync), the display controller judges whether a row transparency tag corresponding to a current UI frame to be displayed is valid; if yes, S630 is executed; otherwise S640 is executed.

In S630, the display controller reads a tag value corresponding to a current row to be read in the current UI frame to be displayed.

In S631, the display controller judges whether the current row to be read is a transparent row according to the tag value corresponding to the current row to be read; if yes, S632 is executed; otherwise, S633 is executed.

In S632, the display controller does not read image data corresponding to the current row to be read, and S630 is returned to be executed.

In S633, the display controller reads the image data corresponding to the current row to be read, and S630 is returned to be executed.

In S640, the display controller reads the image data corresponding to the current row to be read in the current UI frame to be displayed, and detects whether transparency of all the image data corresponding to the current row to be read is 0; if yes, S641 is executed; otherwise S642 is executed.

In S641, the display controller tags the current row to be read as a transparent row region, and S640 is returned to be executed.

In S642, the display controller tags the current row to be read as a nontransparent row region, and S640 is returned to be executed.

Through the abovementioned implementation method shown in FIG. 6, one or two and more transparent regions formed by multiple transparent row regions in a horizontal direction may be detected. For example, as shown in FIG. 7(a), a top of the current UI frame to be displayed is used for displaying a station logo and other prompt information provided by an App, and a bottom is used for displaying current caption information to be played. Through the abovementioned method shown in FIG. 6, it is easily detected that a middle part of the UI frame shown in FIG. 7(a) is a transparent region, i.e., the shadow region in FIG. 7(a). When only the bottom of the current UI frame to be displayed is required to display the current caption information to be played, as shown in FIG. 7(b), it is easily detected that other regions except the bottom of the UI frame shown in FIG. 7(b) are transparent regions, i.e., the shadow region shown in FIG. 7(b). As shown in FIG. 7(c), FIG. 7(c) illustrates the condition that transparent regions are at the top and bottom of the current UI frame to be displayed respectively. From FIG. 7(c), it can be seen that the middle part of the current UI frame to be displayed is used for a UI interaction region during displaying of video playing. Therefore, through the abovementioned method, the transparent region of the UI frame may also be easily detected.

Figure 7:
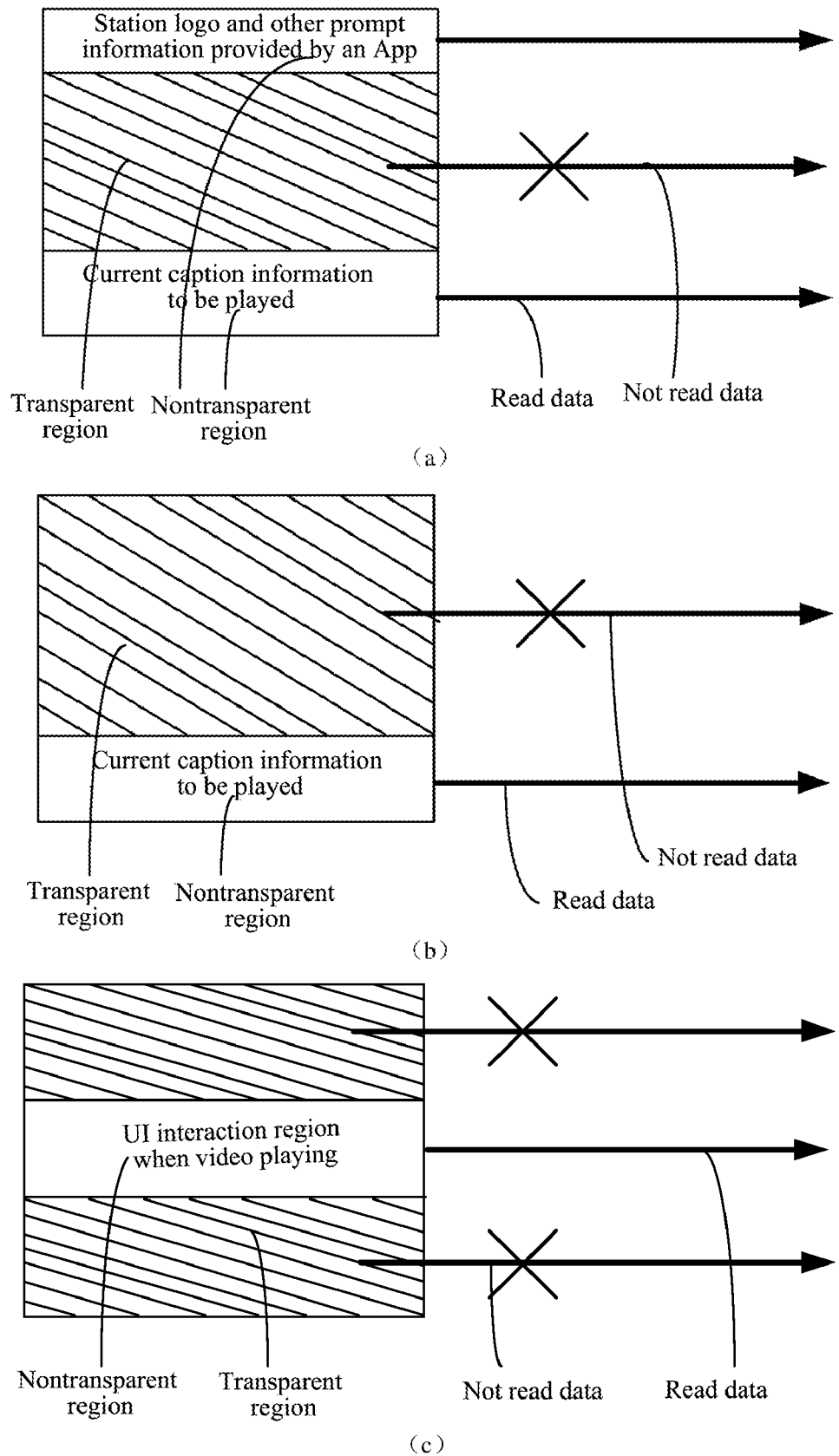
FIG. 7 is a schematic diagram of interface display of another UI frame according to an embodiment of the present disclosure.

For some forms of the UI frame to be displayed shown in FIG. 7, when a next frame is starting and the image data of the UI frame to be displayed is kept unchanged, the display controller is not required to read the image data corresponding to the transparent region of the UI frame to be displayed in the UI frame buffer region through a bus, that is, as long as the display controller reads the image data corresponding to the nontransparent region of the UI frame to be displayed through the bus, an interface display requirement is met. Therefore, the bandwidth consumption of the display controller may be effectively reduced. Particularly when the whole region of the current UI frame to be displayed is a transparent region, a bandwidth saving effect achieved by the method is more obvious because the display controller is not required to access the UI frame buffer region through the bus to read the image data of the current UI frame to be displayed at all.

Specifically, during a practical engineering application, with a condition that a resolution of a UI is 1,920×1,080 as an example the effects achieved by the abovementioned method are described as follows. (1) When full-screen playing of a video, a bus bandwidth consumed by the UI is reduced from 3.84 Gbps to 0; if a resolution of the played video is 1,920×1,080 when full-screen playing of a video, the total bandwidth consumption of the display controller may be reduced by 72%; and if the resolution of the played video is 4K when full-screen playing of a video, the total bandwidth consumption of the display controller may be reduced by 40%. (2) When a caption is required to be displayed through the UI, the consumed total bandwidth is determined by a row number occupied by the caption. Under a normal condition, the bus bandwidth consumed by the UI may be reduced by 90% to 95%. (3) When short-term UI interaction is required at the same time of video playing, the bus bandwidth consumed by the UI is also determined by a row number of contents displayed on the UI. Under a normal condition, the bus bandwidth consumed by the UI may be reduced by 70% to 90%.

From the above descriptions, it can be seen that, according to the method for reducing the bandwidth consumption of the display controller provided in the embodiment of the present disclosure, the transparent region of the UI frame to be displayed may be determined while the image data of the UI frame to be displayed is read, and when the next frame is starting and the image data of the UI frame to be displayed is kept unchanged, only the image data in the nontransparent region of the UI frame to be displayed is read, namely the image data in the transparent data of the UI frame to be displayed is not read. Therefore, the bandwidth consumption of the display controller is greatly reduced.

Embodiment Three

Figure 8:
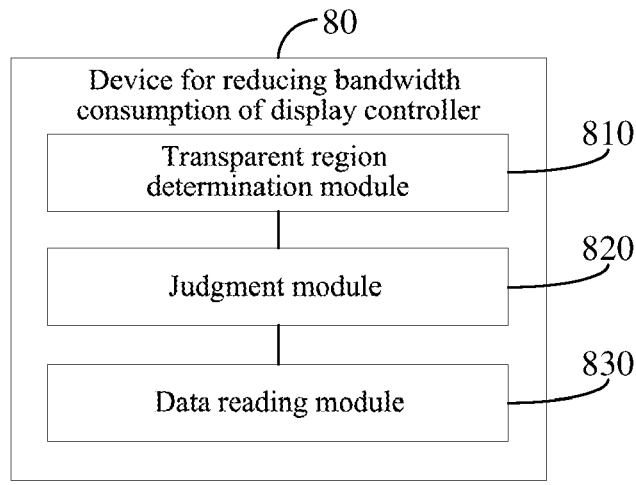
FIG. 8 is a structure diagram of a device for reducing bandwidth consumption of a display controller according to an embodiment of the present disclosure.

Based on the same abovementioned technical concept, as shown in FIG. 8, the FIG. 8 illustrates a device 80 for reducing bandwidth consumption of a display controller according to an embodiment of the present disclosure. From the figure, it can be seen that the device 80 may include a transparent region determination module 810, a judgment module 820 and a data reading module 830.

The judgment module 820 is configured to judge whether image data of a current UI frame to be displayed is the same as image data of a previous UI frame.

The data reading module 830 is configured to read the image data in a nontransparent region except a transparent region of the previous UI frame.

The transparent region determination module 810 is configured to determine a transparent region of the current UI frame to be displayed according to a preset strategy.

Figure 9:
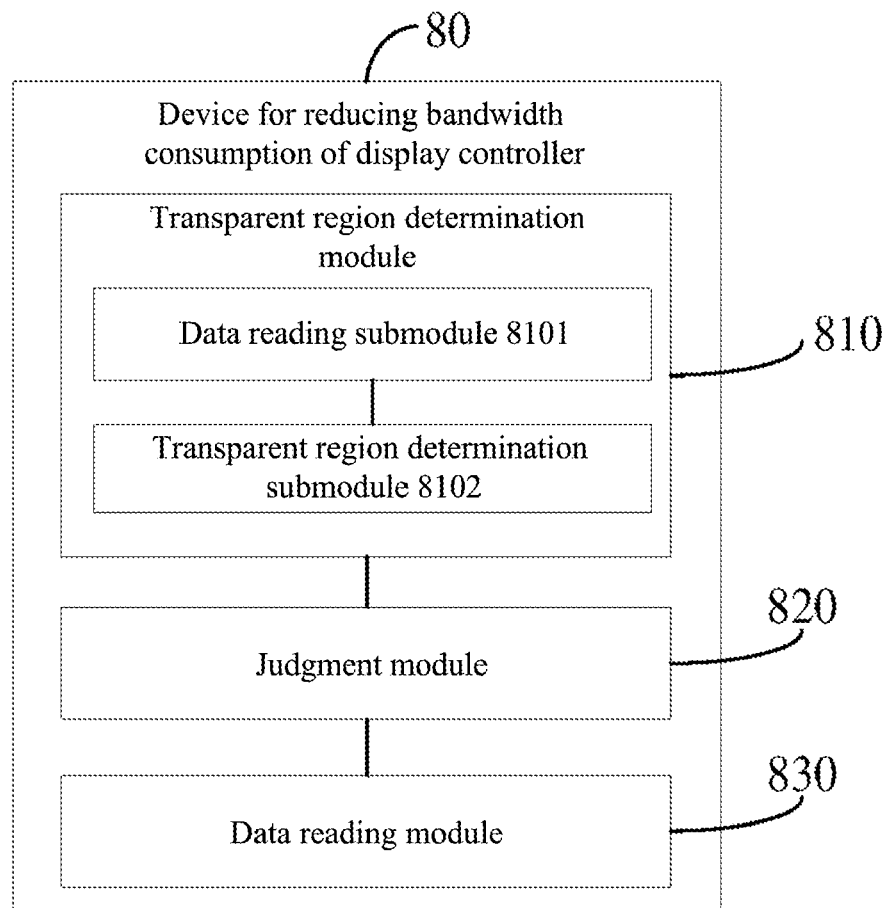
FIG. 9 is a structure diagram of another device for reducing bandwidth consumption of a display controller according to an embodiment of the present disclosure.

In the abovementioned solution, the transparent region determination module 810, as shown in FIG. 9, includes a data reading submodule 8101 and a transparent region determination submodule 8102.

The data reading submodule 8101 is configured to read the image data of the current UI frame to be displayed according to a preset data reading rule.

The transparent region determination submodule 8102 is configured to detect the currently read image data of the UI frame to be displayed according to a preset detection rule and determine the transparent region of the current UI frame to be displayed.

In the abovementioned solution, the data reading submodule 8101 is configured to: read the image data of the current UI frame to be displayed by row according to a preset row reading sequence; or read the image data of the current UI frame to be displayed by preset rectangular region according to a preset rectangle reading sequence.

In the abovementioned solution, the transparent region determination submodule 8102 is configured to: detect transparency of the currently read image data of the UI frame to be displayed by row and determine a transparent row region of the current UI frame to be displayed, wherein the transparent row region refers to a region where the transparency of the image data in a whole row in the current UI frame to be displayed is 0.

In the abovementioned solution, the transparent region determination submodule 8102 is configured to: detect transparency of the currently read image data of the UI frame to be displayed by preset rectangular region and determine a transparent rectangular region of the current UI frame to be displayed, wherein the transparent rectangular region refers to a region where the transparency of the image data in a whole rectangular region in the current UI frame to be displayed is 0.

In addition, each functional module in the present embodiment may be integrated into one processing unit, or each unit may physically exist independently, or two or more than two units may be integrated into a unit. The abovementioned integrated unit may be implemented in a hardware form, or may be implemented in form of software functional module.

When implemented in a form of a software functional module and sold or used as an independent product, the integrated unit may be stored in a computer-readable storage medium. Based on such understanding, the technical solution of the present embodiment substantially or parts making contributions to the existing art or all or part of the technical solution may be embodied in a form of software product, and the computer software product is stored in a storage medium, including a plurality of instructions for enabling a computer device (which may be a personal computer, a server, a network device or the like) or a processor to execute all or part of the acts of the method in the present embodiment. The abovementioned storage medium includes: various media capable of storing program codes such as a U disk, a mobile Hard Disk Drive (HDD), a Read Only Memory (ROM), a Random Access Memory (RAM), a magnetic disk or an optical disk.

Optionally, a computer program instruction corresponding to a method for reducing bandwidth consumption of a display controller in the present embodiment may be stored in a storage medium such as an optical disk, a hard disk drive and a U disk. When the computer program instruction corresponding to the method for reducing the bandwidth consumption of the display controller in the storage medium is read or executed by an electronic device, the following acts are included.

Whether image data of a current UI frame to be displayed is the same as image data of a previous UI frame is judged.

When the image data of the current UI frame to be displayed is the same as the image data of the previous UI frame, the image data in a nontransparent region except a transparent region of the previous UI frame is read.

When the image data of the current UI frame to be displayed is different from the image data of the previous UI frame, a transparent region of the current UI frame to be displayed is determined according to a preset strategy.

Optionally, the act stored in the storage medium that the transparent region of the current UI frame to be displayed is determined according to the preset strategy includes: the image data of the current UI frame to be displayed is read according to a preset data reading rule; the currently read image data of the UI frame to be displayed is detected according to a preset detection rule, and the transparent region of the current UI frame to be displayed is determined.

Optionally, the act stored in the storage medium that the image data of the current UI frame to be displayed is read according to the preset data reading rule includes: the image data of the current UI frame to be displayed is read by row according to a preset row reading sequence; or the image data of the current UI frame to be displayed is read by preset rectangular region according to a preset rectangle reading sequence.

Optionally, the act stored in the storage medium that when the image data of the current UI frame to be displayed is read by row according to the preset row reading sequence, the currently read image data of the UI frame to be displayed is detected according to the preset detection rule and the transparent region of the current UI frame to be displayed is determined includes: transparency of the currently read image data of the UI frame to be displayed is detected by row, and a transparent row region of the current UI frame to be displayed is determined, wherein the transparent row region refers to a region where the transparency of the image data in a whole row in the current UI frame to be displayed is 0.

Optionally, the act stored in the storage medium that when the image data of the current UI frame to be displayed is read by preset rectangular region according to the preset rectangle reading sequence, the currently read image data of the UI frame to be displayed is detected according to the preset detection rule and the transparent region of the current UI frame to be displayed is determined includes: Transparency of the currently read image data of the UI frame to be displayed is detected by preset rectangular region, and a transparent rectangular region of the current UI frame to be displayed is determined, wherein the transparent rectangular region refers to a region where the transparency of the image data in a whole rectangular region in the current UI frame to be displayed is 0.

Embodiment Four

Figure 10:
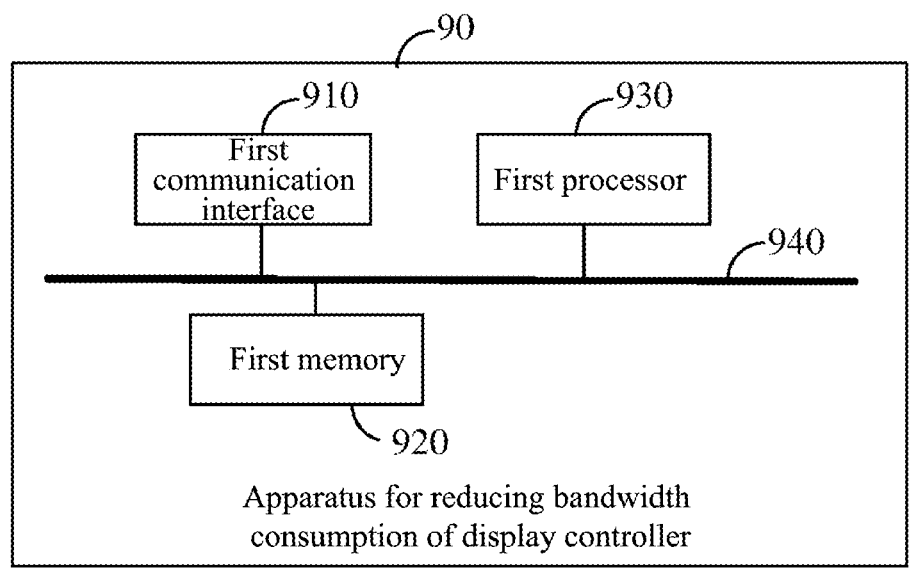
FIG. 10 is a structure diagram of an apparatus for reducing bandwidth consumption of a display controller according to an embodiment of the present disclosure.

Based on the technical concept the same as that of the abovementioned embodiments, referring to FIG. 10, FIG. 10 illustrates apparatus 90 for reducing bandwidth consumption of a display controller according to an embodiment of the present disclosure. The apparatus 90 may include a first communication interface 910, a first memory 920, a first processor 930 and a first bus 940.

The first bus 940 is configured to connect the first communication interface 910, the first processor 930 and the first memory 920 and provide connections for communication between these devices.

The first communication interface 910 is configured to perform data transmission with an external network element.

The first memory 920 is configured to store an instruction and data.

The first processor 930 is configured to execute the instruction to judge whether image data of a current UI frame to be displayed is the same as image data of a previous UI frame; when the image data of the current UI frame to be displayed is the same as the image data of the previous UI frame, read the image data in a nontransparent region except a transparent region of the previous UI frame; and when the image data of the current UI frame to be displayed is different from the image data of the previous UI frame, determine a transparent region of the current UI frame to be displayed according to a preset strategy.

In a practical application, the abovementioned first memory 920 may be a first volatile memory, such as a first RAM, or a first non-volatile memory such as a first ROM, a first flash memory, an HDD or a Solid-State Drive (SSD), or a combination of first memories of the abovementioned types, and provides the instruction and the data for the first processor 930.

The first processor 930 may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a CPU, a controller, a microcontroller and a microprocessor. It can be understood that, for different apparatuses, other electronic devices may also be used for implementing functions of the first processor, and there are no specific limits made in the embodiment of the present disclosure.

Exemplarily, the first processor 930 may be configured to: read the image data of the current UI frame to be displayed according to a preset data reading rule; and detect the currently read image data of the UI frame to be displayed according to a preset detection rule and determine the transparent region of the current UI frame to be displayed.

Exemplarily, the first processor 930 may be configured to: read the image data of the current UI frame to be displayed by row according to a preset row reading sequence; or read the image data of the current UI frame to be displayed by preset rectangular region according to a preset rectangle reading sequence.

Exemplarily, the first processor 930 may be configured to: detect transparency of the currently read image data of the UI frame to be displayed by row and determine a transparent row region of the current UI frame to be displayed, wherein the transparent row region refers to a region where the transparency of the image data in a whole row in the current UI frame to be displayed is 0.

Exemplarily, the first processor 930 may be configured to: detect transparency of the currently read image data of the UI frame to be displayed by preset rectangular region and determine a transparent rectangular region of the current UI frame to be displayed, wherein the transparent rectangular region refers to a region where the transparency of the image data in a whole rectangular region in the current UI frame to be displayed is 0.

An embodiment of the present disclosure further provides a method for reducing bandwidth consumption of a display controller, applied to the display controller. The method for reducing bandwidth consumption of the display controller includes: if image data of a User Interface (UI) is updated in an nth screen refresh cycle, image data of a whole frame of a buffered UI frame is read from a UI buffer region; a transparent region of the read UI frame is determined according to a preset strategy; and if no image data of the UI is updated in an (n+1)th screen refresh cycle, image data in a nontransparent region is read from the UI buffer region according to a determination result, wherein n is 0 or a positive integer.

In the present embodiment, the display controller may be a controller directly connected with a display screen.

The display screen is refreshed according to a screen refresh cycle. The image data of the UI frame may include displayed information of a smart television such as a station logo, or, displayed information related to switching of the smart television such as a channel number.

In the present embodiment, only when image data of the UI is updated, the display controller may read the image data of the whole UI frame buffered in a UI buffer region, that is, the transparent region and the nontransparent region are not distinguished. In the present embodiment, the transparent region in the UI frame is a region where there is no data required to be output to a user for viewing, and the nontransparent region displays data required to be viewed by the user, for example, a station logo, a channel number or a user control that the user may operate by a remote controller, a mobile phone or a wireless mouse, etc.

Under a normal condition, if a channel switching event occurs, or, after an event that a smart set-top box is controlled by the remote controller, the mouse or the mobile phone, etc. to execute a corresponding operation is detected, the image data of the UI may change, so that an application drive of the smart television may know time when the image data of the UI may change. When a change occurs, the application drive may notify the display controller. In such a manner, the display controller may know the time when updating of image data of the UI occurs from the smart set-top box. Therefore, the display controller may judge whether there is a difference between image data of a current UI frame to be displayed and image data of a previous UI frame to be displayed by interacting with a device such as the application drive of the smart set-top box.

In the present embodiment, if it is found that data of the UI is updated, that is, the image data of the current UI frame to be displayed is different from the image data of the previous UI frame, the display controller may read all image data of the whole UI frame from a UI buffer region buffering the image data of the whole UI frame.

During the reading process, the display controller may parse a pixel value of each pixel. For example, if a value of a current pixel is 0, it may be determined as a transparent pixel. Therefore, the read image data may be parsed to determine the transparent region.

After the transparent region is determined, the transparent region and the nontransparent region may be distinguished through a transparent tag.

If the data of the UI is read in a next screen refresh cycle, only the image data in the nontransparent region is required to be read, and the image data in the transparent region is not required to be read. The display controller considers by default a region where the data is not read as a transparent region. As a result, when no image data of the UI is updated, it is apparent that only the image data in the nontransparent region is read in any screen refresh cycle and the bus between the UI buffer region and the display controller is only required to transmit the image data in the nontransparent region. Thus, it is apparent that a data transmission volume can be greatly reduced, and bandwidth consumption of the bus and reading resources consumed by data reading of the display controller and the like can be reduced.

Optionally, determining the transparent region of the read UI frame includes: parsing image data of a whole frame of the read UI frame, and determining a region where transparent pixels are located; and when transparent pixels of which a number is not less than a preset number are located together, determining a region where transparent pixels of which a number is equal to the preset number are located as the transparent region.

Some transparent pixels are scattered, one or more transparent pixels may form a relatively small transparent region, but such a transparent region is too small to conveniently tag. Therefore, in the present embodiment, only when the number of the transparent pixels located together reaches the preset number, the region where the transparent pixels are located is tagged as the transparent region.

For example, parsing the image data of the whole frame of the read UI frame, and determining the region where the transparent pixels are located includes: parsing image data of a current UI frame to be displayed by row according to a preset row reading sequence; determining the region where the transparent pixels of which the number is equal to the preset number are located as the transparent region when the transparent pixels of which the number is not less than the preset number are located together includes: when all pixels in a row are the transparent pixels, determining the corresponding row as a transparent row.

Therefore, in the present embodiment, the transparent region includes the transparent row.

For another example, parsing the image data of the whole frame of the read UI frame, and determining the region where the transparent pixels are located includes: reading the image data of the current UI frame to be displayed by preset rectangular region according to a preset rectangle reading sequence; determining the region where the transparent pixels of which the number is equal to the preset number are located as the transparent region when the transparent pixels of which the number is not less than the preset number are located together includes: when all pixels in a rectangular region are the transparent pixels, determining the corresponding rectangular region as a transparent rectangular region.

In the present embodiment, the transparent region includes the transparent rectangular region.

In still some embodiments, the transparent region may further include a transparent column.

The transparent region obtained in form of the transparent row, the transparent rectangular region and the transparent column is a regular region, so that it is convenient for the display controller to tag, the region to be processed subsequently.

In some embodiments, a device for reducing bandwidth consumption of a display controller applied to the display controller includes a reading unit and a determination unit.

The reading unit is configured to, if image data of a UI is updated in an nth screen refresh cycle, read image data of a whole frame of a buffered UI frame from a UI buffer region.

The determination unit is configured to determine a transparent region of the read UI frame according to a preset strategy.

The reading unit is further configured to, if no image data of the UI is updated in an (n+1)th screen refresh cycle, read image data in a nontransparent region from the UI buffer region according to a determination result, wherein n is 0 or a positive integer.

The reading unit and the determination unit may correspond to a processor or a processing circuit. The processor may be an Application Processor (AP), a DSP or an FPGA. The processing circuit may be an application specific integrated circuit.

Optionally, the determination unit includes: a parsing module and a determination module. The parsing module is configured to parse the image data of a whole frame of the read UI frame, and determine a region where transparent pixels are located. The determination module is configured to, when transparent pixels of which a number is not less than a preset number are located together, determine a region where transparent pixels of a number is equal to the preset number are located as a transparent region.

For example, the parsing module is configured to parse the image data of the current UI frame to be displayed by row according to a preset row reading sequence.

The determination module is configured to, when all pixels in a row are the transparent pixels, determine the corresponding row as a transparent row.

Therefore, in the present embodiment, the transparent region includes the transparent row. For another example, the parsing module is configured to read the image data of the current UI frame to be displayed by preset rectangular region according to a preset rectangle reading sequence.

The determination module is configured to, when all pixels in a rectangular region are the transparent pixels, determine the corresponding rectangular region as a transparent rectangular region.

An embodiment of the present disclosure further provides a display controller including a memory and a processor.

The memory is configured to store information.

The processor is configured to be connected with the memory and configured to execute computer-executable codes stored in the memory to be enabled to implement the method for reducing the bandwidth consumption of the display controller provided in the abovementioned one or more technical solutions.

An embodiment of the present disclosure further provides a computer storage medium, on which computer-executable instructions are stored. The computer-executable instructions are used for implementing the method for reducing the bandwidth consumption of the display controller provided in the abovementioned one or more technical solutions.

Here, the computer storage medium may be a random storage medium, a read only memory, a flash memory or a mobile hard disk drive, etc. and is optionally a non-transitory storage medium.

Those skilled in the art should know that the embodiments of the present disclosure may be provided as a method, a system or a computer program product. Therefore, the present disclosure may adopt a form of hardware embodiment, software embodiment or combined software and hardware embodiment. Moreover, the present disclosure may adopt a form of a computer program product implemented on one or more computer-available storage media (including, but not limited to, a disk memory and an optical memory) including computer-available program codes.

The present disclosure is described with reference to flowcharts and/or block diagrams of the method, device (system) and computer program product according to the embodiment of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing device to produce a machine, so that a device for realizing a function specified in one flow or more flows in the flowcharts and/or one block or more blocks in the block diagrams is produced through the instructions executed by the computer or the processor of the other programmable data processing device.

These computer program instructions may also be stored in a computer-readable memory capable of guiding the computer or the other programmable data processing device to work in a specific manner, so that a product including an instruction device may be produced by the instructions stored in the computer-readable memory. The instruction device implements the functions specified in one flow or many flows in the flowcharts and/or one block or many blocks in the block diagrams.

These computer program instructions may further be loaded onto the computer or the other programmable data processing device, so that a series of operating acts are executed on the computer or the other programmable data processing device to generate processing implemented by the computer, and acts for implementing the functions specified in one flow or many flows in the flowcharts and/or one block or many blocks in the block diagrams are provided by the instructions executed on the computer or the other programmable data processing device.

The above is only the alternative embodiments of the present disclosure and not intended to limit the scope of protection of the present disclosure. It should be understood that any modifications made according to the principle of the present disclosure fall within the scope of protection of the present disclosure.

INDUSTRIAL APPLICABILITY

In the embodiments of the present disclosure, when finding that the image data of the UI frame to be read in the present frequency refresh cycle is the same as the image data of the previous UI frame, the display controller may only read the data in the nontransparent region, so that data reading from the transparent region may be reduced, the data volume transmitted by the bus is reduced, the occupied bandwidth is reduced, and a positive industrial effect is achieved. In addition, when finding that the two UI frames are different, the display controller may read all the data and determine through parsing which regions are the transparent regions. If no image data of the UI is updated in the next frequency refresh cycle, the display controller is only required to read the data in the transparent region according to the currently determined transparent region, so that the present disclosure has a strong applicability.

What is claimed is:

1. A method for reducing bandwidth consumption of a display controller, comprising:
    judging whether image data of a current User Interface (UI) frame to be displayed is the same as image data of a previous UI frame;
    when the image data of the current UI frame to be displayed is the same as the image data of the previous UI frame, reading image data in a nontransparent region except a transparent region of the previous UI frame; and
    when the image data of the current UI frame to be displayed is different from the image data of the previous UI frame, determining a transparent region of the current UI frame to be displayed according to a preset strategy.

2. The method according to claim 1, wherein determining the transparent region of the current UI frame to be displayed according to the preset strategy comprises:
    reading the image data of the current UI frame to be displayed according to a preset data reading rule; and
    detecting the currently read image data of the UI frame to be displayed according to a preset detection rule, and determining the transparent region of the current UI frame to be displayed.

3. The method according to claim 2, wherein reading the image data of the current UI frame to be displayed according to the preset data reading rule comprises:
    reading the image data of the current UI frame to be displayed by row according to a preset row reading sequence; or
    reading the image data of the current UI frame to be displayed by preset rectangular region according to a preset rectangle reading sequence.

4. The method according to claim 3, wherein detecting the currently read image data of the UI frame to be displayed according to the preset detection rule, and determining the transparent region of the current UI frame to be displayed when the image data of the current UI frame to be displayed is read by row according to the preset row reading sequence comprises:
    detecting transparency of the currently read image data of the UI frame to be displayed by row and determining a transparent row region of the current UI frame to be displayed, wherein the transparent row region refers to a region where the transparency of image data in a whole row in the current UI frame to be displayed is 0.

5. The method according to claim 3, wherein detecting the currently read image data of the UI frame to be displayed according to the preset detection rule, and determining the transparent region of the current UI frame to be displayed when the image data of the current UI frame to be displayed is read by preset rectangular region according to the preset rectangle reading sequence comprises:
    detecting transparency of the currently read image data of the UI frame to be displayed by preset rectangular region and determining a transparent rectangular region of the current UI frame to be displayed, wherein the transparent rectangular region refers to a region where the transparency of image data in a whole rectangular region in the current UI frame to be displayed is 0.

6. A display controller, comprising:
    a memory, configured to store information; and
    a processor, configured to be connected with the memory and configured to execute computer-executable codes stored in the memory to be enabled to implement the method according to claim 1.

7. A computer storage medium, on which computer-executable instructions are stored, the computer-executable instructions being used for the method according to claim 1.

8. A device for reducing bandwidth consumption of a display controller, comprising a judgment module, a data reading module and a transparent region determination module, wherein
    the judgment module is configured to judge whether image data of a current User Interface (UI) frame to be displayed is the same as image data of a previous UI frame;
    the data reading module is configured to read image data in a nontransparent region except a transparent region of the previous UI frame; and
    the transparent region determination module is configured to determine a transparent region of the current UI frame to be displayed according to a preset strategy.

9. The device according to claim 8, wherein the transparent region determination module comprises a data reading submodule and a transparent region determination submodule, wherein
    the data reading submodule is configured to read the image data of the current UI frame to be displayed according to a preset data reading rule; and
    the transparent region determination submodule is configured to detect the currently read image data of the UI frame to be displayed according to a preset detection rule and determine the transparent region of the current UI frame to be displayed.

10. The device according to claim 9, wherein the data reading submodule is configured to read the image data of the current UI frame to be displayed by row according to a preset row reading sequence, or, read the image data of the current UI frame to be displayed by preset rectangular region according to a preset rectangle reading sequence.

11. The device according to claim 10, wherein the transparent region determination submodule is configured to detect transparency of the currently read image data of the UI frame to be displayed by row and determine a transparent row region of the current UI frame to be displayed, wherein the transparent row region refers to a region where the transparency of image data in a whole row in the current UI frame to be displayed is 0.

12. The device according to claim 10, wherein the transparent region determination submodule is configured to detect transparency of the currently read image data of the UI frame to be displayed by preset rectangular region and determine a transparent rectangular region of the current UI frame to be displayed, wherein the transparent rectangular region refers to a region where the transparency of image data in a whole rectangular region in the current UI frame to be displayed is 0.

13. A method for reducing bandwidth consumption of a display controller, applied to the display controller, and the method comprising:
if image data of a User Interface (UI) is updated in an nth screen refresh cycle, reading image data of a whole frame of a buffered UI frame from a UI buffer region;
determining a transparent region of the read UI frame according to a preset strategy; and
if no image data of the UI is updated in an (n+1)th screen refresh cycle, reading image data of a nontransparent region from the UI buffer region according to a determination result, wherein n is 0 or a positive integer.

14. The method according to claim 13, wherein determining the transparent region of the read UI frame according to the preset strategy comprises:
parsing the image data of the whole frame of the read UI frame to determine a region where transparent pixels are located; and
when transparent pixels of which a number is not less than a preset number are located together, determining a region where transparent pixels of which a number is equal to the preset number are located as the transparent region.

15. The method according to claim 14, wherein
parsing the image data of the whole frame of the read UI frame to determine the region where the transparent pixels are located comprises:
parsing image data of a current UI frame to be displayed by row according to a preset row reading sequence; and
determining the region where the transparent pixels of which the number is equal to the preset number are located as the transparent region when the transparent pixels of which the number is not less than the preset number are located together comprises:
when all pixels in a row are the transparent pixels, determining the corresponding row as a transparent row.

16. The method according to claim 14, wherein
parsing the image data of the whole frame of the read UI frame to determine the region where the transparent pixels are located comprises:
reading image data of the current UI frame to be displayed by preset rectangular region according to a preset rectangle reading sequence; and
determining the region where the transparent pixels of which the number is equal to the preset number are located as the transparent region when the transparent pixels of which the number is not less than the preset number are located together comprises:
when all pixels in a rectangular region are the transparent pixels, determining the corresponding rectangular region as a transparent rectangular region.

17. A display controller, comprising:
a memory, configured to store information; and
a processor, configured to be connected with the memory and configured to execute computer-executable codes stored in the memory to be enabled to implement the method according to claim 13.

18. A computer storage medium, on which computer-executable instructions are stored, the computer-executable instructions being used for the method according to claim 13.

* * * * *